United States Patent
Däumling (10) Patent No.: US 6,750,399 B1
(45) Date of Patent: Jun. 15, 2004

(54) CABLE, A METHOD OF CONSTRUCTING A CABLE, AND USE OF A CABLE

(75) Inventor: Manfred Däumling, Brøndby (DK)

(73) Assignee: NKT Cables Ultera A/S, Brondby (DK)

( * ) Notice: Subject to any disclaimer, the term of this patent is extended or adjusted under 35 U.S.C. 154(b) by 0 days.

(21) Appl. No.: 09/890,624

(22) PCT Filed: Feb. 21, 2000

(86) PCT No.: PCT/DK00/00069

§ 371 (c)(1),
(2), (4) Date: May 16, 2002

(87) PCT Pub. No.: WO00/49626

PCT Pub. Date: Aug. 24, 2000

(30) Foreign Application Priority Data

Feb. 19, 1999 (DK) .......................... 1999 00221

(51) Int. Cl.⁷ ........................... H01B 7/18; H01B 12/00
(52) U.S. Cl. ................. 174/102 R; 174/108; 174/125.1
(58) Field of Search ................ 174/102 R, 106, 174/125.1, 128.1, 226.4, 28, 108; 333/243, 244, 245, 246; 505/230, 231

(56) References Cited

U.S. PATENT DOCUMENTS

| | | | | |
|---|---|---|---|---|
| 3,730,966 A | | 5/1973 | Aupoix et al. ............ | 174/15 C |
| 4,093,817 A | * | 6/1978 | Jungst et al. .................. | 174/32 |
| 5,952,614 A | * | 9/1999 | Ries ....................... | 174/106 R |
| 6,005,194 A | * | 12/1999 | Ries ........................ | 174/125.1 |
| 6,417,458 B1 | * | 7/2002 | Mukoyama et al. ..... | 174/125.1 |
| 6,552,260 B2 | | 3/2003 | Fujikami et al. | |
| 2002/0035039 A1 | * | 3/2002 | Nassi et al. ................. | 505/100 |
| 2002/0038719 A1 | * | 4/2002 | Nassi et al. ............... | 174/125.1 |

FOREIGN PATENT DOCUMENTS

| | | | | |
|---|---|---|---|---|
| DE | 2541792 | | 3/1977 | |
| DE | 2517924 | | 4/1977 | |
| EP | 0623937 | | 11/1994 | |
| FR | 1490519 | | 4/1967 | |
| GB | 1 285 442 | * | 8/1972 | ......... H01V/11/02 |
| GB | 2 029 630 A | * | 5/1980 | ............ H01B/7/00 |
| JP | 01-122510 A | * | 5/1989 | ........... H01B/12/02 |
| JP | 10-312718 A | * | 11/1998 | ........... H01B/12/06 |
| WO | 9639705 | | 12/1996 | |
| WO | WO 98/13859 | * | 9/1997 | ............ H01B/7/00 |

* cited by examiner

Primary Examiner—William H. Mayo, III
(74) Attorney, Agent, or Firm—Ladas & Parry (57) ABSTRACT

A cable has three or more conducting layers which are mutually separated by isolating layers, resistive layers, or reduced electrical contact surfaces. The conducting layers include electrical conductors helically arranged with predetermined pitch lengths. The predetermined pitch lengths increase in steps from layer to layer from a radial innermost conducting layer to an intermediate conducting layer located between the radial innermost conducting layer and a radial outermost conducting layer, but the predefined pitch lengths remain substantially constant or decrease in steps from layer to layer from the intermediate conducting layer to the radial outermost conducting layer. As a result, an even current distribution and, thereby, a reduced AC loss is obtained.

19 Claims, 6 Drawing Sheets

Prior art

Prior art

CABLE, A METHOD OF CONSTRUCTING A CABLE, AND USE OF A CABLE

BACKGROUND OF THE INVENTION

The present invention relates to a cable with at least one cable core having three or more conducting layers which are mutually separated by isolating layers, where said conducting layers include electrical conductors which are arranged helically with predetermined pitch length, and in particular to an electrical cable with reduced AC loss.

When using electrical power cables it is generally desirable to obtain as low power loss as possible. Cables adapted to have low losses are known from the prior art. The prior art discloses AC cables with at least one cable core having a number of conducting layers, which are mutually separated by isolating layers. The conducting layers are normally formed by electrical conductors, which are arranged helically with predetermined pitch angles.

The innermost conductor which may be of superconducting material is normally wound spirally around a central former and hereby forms a conducting layer. Likewise, the other conducting layers which may also be of superconducting material are normally wound spirally around the isolating layers adapted to separate the conducting layers. The number of conducting layers required depends on the desired use of the cable and on the current carrying capability of the tapes used.

The current distribution between the layers depends on the winding pitches, the layer radii, the layer thickness, and the resistivity of the layers of the conductors, as the inductance between the layers depends on the winding pitches. According to the prior art patches are therefore varied from layer to layer in a given way. As a result the current will distribute more equally between the conducting layers resulting in reduced AC losses.

WO 96/39705 discloses a cable with a central carrier body around which electrical conductors are arranged helically with predetermined pitch angles in at least three conductor positions. The pitch angles of the conductors in the individual conductor positions are selected such that they either increase or decrease in steps from position to position between a first value of the radial innermost conductor position and a second value of the radial outermost conductor position.

Even though the AC cables according to the prior art are found to be useful, they have the drawback that quite large variations of the winding pitches are required in order to obtain an equal current distribution. Furthermore, in practice, it is difficult to produce cables with these large variations in pitches.

SUMMARY OF THE INVENTION

Therefore the object of the invention is to provide an AC cable with low AC-loss and which overcome the disadvantages of the state of the art cables.

This object is achieved by a cable with at least one cable core having three or more conducting layers which are mutually separated by isolating layers, where said conducting layers include electrical conductors which are arranged helically with predetermined pitch length, in which said predefined pitch length increase in steps from layer to layer from the radial outermost conducting layer to an intermediate conducting layer located between the radial innermost conducting layer and the radial outermost conducting layer, and said predefined pitch length remain substantially constant or decrease in steps from layer to layer from said intermediate conducting layer to the radial innermost conducting layer.

Hereby, a homogenous distribution of the current in the cable and thus a reduction of the AC losses in the cable is obtained. Further, a cable having less variations of the winding pitches compared to cables of the prior art can be obtained. This is of interest as strongly varying pitches lead to differential thermal contraction of the different layers during cool-down of the cable. Further, small variation of the pitches between the layers is desirable as these result in beneficial mechanical properties of the cable.

The invention is based on the fact that the equations to be solved in order to design a cable of the above-mentioned type having reduced AC losses have been found to be very complex and cannot be solved analytically. The equations include a plurality of coupled parameters making the system difficult to solve, i.e. when varying one parameter, one or more other parameters may also be affected. When using a simplified model, the relation between some parameters can be explained e.g. the inductance is found to decrease as the radius of a conducting layer is increased, and the self-inductance of a conducting layer increases as the pitch angle increases. In cables not containing superconductors, layer resistance also plays a role. In practice it has been found that a homogenous current distribution can be obtained over the cross section of a cable of the above-mentioned type when designing the cable according to the invention, and hereby the above-mentioned advantages are obtained.

A preferred embodiment of the invention comprises the following features:
  at least one of said isolating layers has a thickness different from the thickness of at least one of the other isolating layers,
  at least one of said conducting layers has a thickness different from the thickness of at least one of the other conducting layers,
  at least one of said isolating layers includes material which is different from the material of at least one of the other isolating layers, or
  at least one of said conducting layers includes material, which is different from the material of at least one of the other conducting layers.

Hereby, a homogenous distribution of the current in the cable and thus a reduction of the AC losses in the cable is obtained. Even though a cable can be constructed having a single of the above-mentioned characteristics, two or more characteristics can be combined. Hereby, an increased degree of freedom when designing a cable of the above-mentioned type is obtained, as the desired homogenous distribution of the current in the cable can be obtained by varying one or more additional parameters, i.e. in addition to varying the winding pitches, the thickness of the isolating layers, the thickness of the conducting layers, the material of the isolating layers may be varied, and/or the material of the conducting layers may be varied. As a result, the variation in winding pitches can be reduced whereby further Improvement of the mechanical properties of the cable is obtained.

In a preferred embodiment at least one of said isolating layers is thicker than the radial outermost of the neighbouring isolating layers. In another preferred embodiment at least one of said conducting layers is thicker than the radial outermost of the neighbouring conducting layers.

In accordance with a further embodiment said thickness of said isolating layers and/or said conducting layers decrease in steps from layer to layer between a first value of the radial innermost isolating layer and a second value of the radial outermost isolating layer.

In a preferred embodiment, the resistivity of the conducting layer material increases in steps from layer to layer from a first value of the radial innermost conducting layer to a second value of the radial outermost conducting layer, i.e. the invention can be used in non-superconducting cables.

In another preferred embodiment that said conductors includes super-conducting material, i.e. the invention can be used in superconducting cables. For example, said super-conducting material is high-$T_c$ super-conducting material.

The invention also relates to a method of producing a cable of the above-mentioned type.

The present invention further relates to the use of a cable according to the invention as a power cable.

BRIEF DESCRIPTION OF THE DRAWING

The present invention will now be described more fully with reference to the drawings, in which.

DESCRIPTION OF THE EMBODIMENTS

Generally, it is desirable to obtain as low power loss as possible in electrical cables, e.g. when the cable is used as an AC power cable, e.g. an underground cable, or an overhead power line, e.g. as power lines for electrically driving vehicles such as trains.

The prior art discloses cables with at least one cable core having a number of conducting layers which are mutually separated by isolating layers, resistive layers, or reduced electrical contact surfaces. The term isolating layer shall be read as isolating layers, resistive layers, or reduced electrical contact surfaces in this context. The conducting layers are normally formed by electrical conductors which are arranged helically with predetermined pitch angles.

Figure 1:
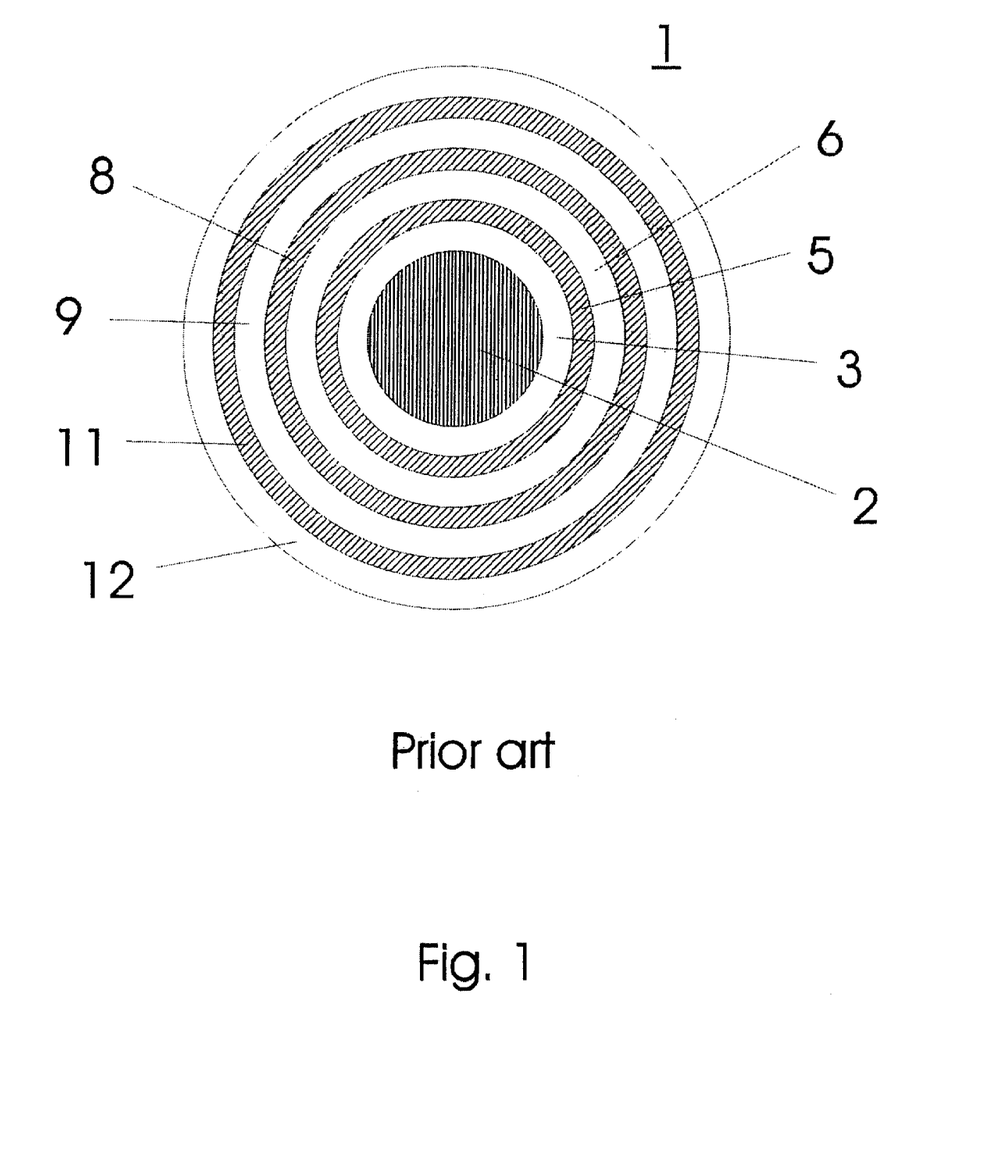
FIG. 1 shows a schematic cross section view of the current carrying part of a cable according to the prior art.

FIG. 1 is a cross section view of a cable 1 according to the prior art and illustrates the structure of the cable 1. The cable 1 includes a central former 2 around which an electrical conductor is arranged helically with a predetermined pitch angle. The conductor hereby forms a conducting layer 3 which is adapted to carry an electrical current in the cable 1.

As can be seen from the figure, the shown cable 1 includes four conducting layers 3, 6, 9 and 12. The conducting layers are mutually separated by so-called isolating layers 5, 8 and 11, i.e. conducting layers 3 and 6 are separated by the isolating layer 5, conducting layer 6 and 9 are separated by the isolating layer 8, and so forth. The isolating layers have a given constant or an approximately constant thickness.

The other conducting layers 6, 9 and 12 also include conductors which are wound spirally around the isolating layers adapted to separate the conducting layer. The number of conducting layers in the cable depends on the desired use of the cable and on the current carrying capability of the tapes used.

Figure 5:
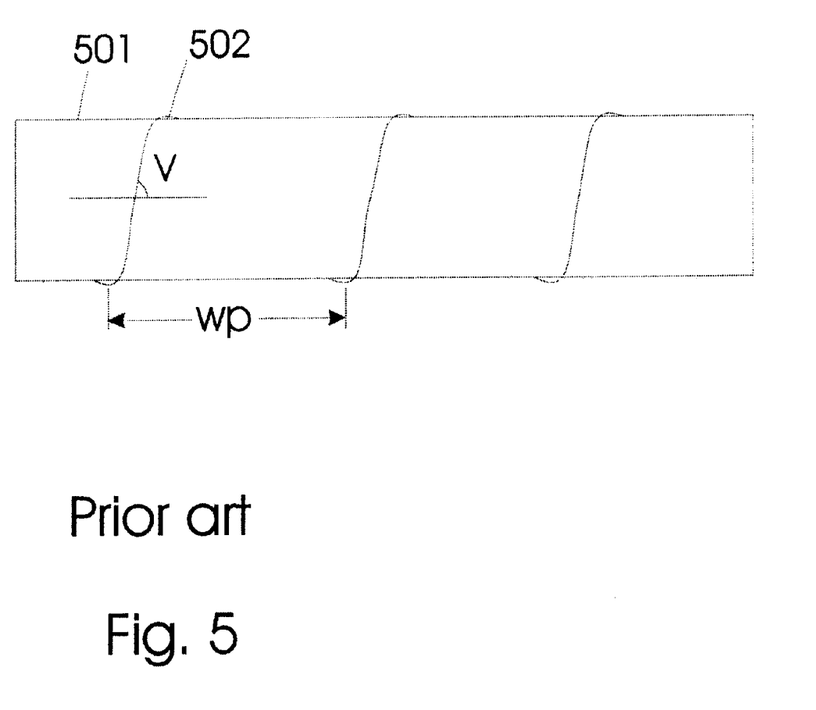
FIG. 5 illustrates the winding pitch and the pitch angle of a conductor in a conducting layer of an electrical cable.
Figure 6:
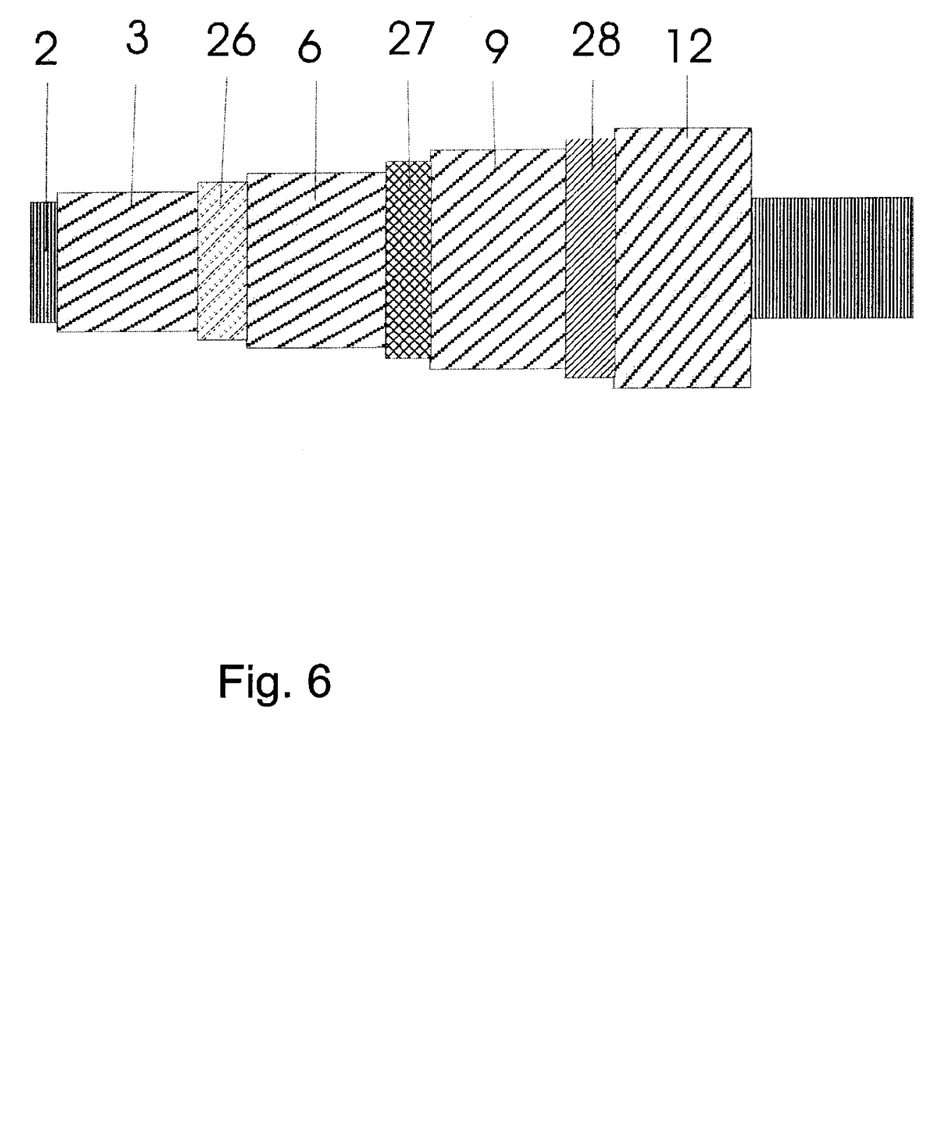

The winding pitch and the pitch angle of a conductor in a cable is illustrated in FIG. 5. The figure shows a cable 501 including a number of layers which is illustrated by the view to the left in the figure. To the right, the same cable 501 is shown. A conductor 502, which is wound around a given layer in the cable, is also shown in the figure. The conductor 502 illustrates a conductor in a conducting layer of the cable 501. In the figure WP shows the winding pitch of the conductor, i.e. the distance from the start to the end of a single winding, and the pitch angle.

The current distribution between the layers depends on the variation of the winding pitches of the conductors as the inductance between the layers depends on the winding pitches. According to the prior art the pitches are therefore varied from layer to layer in the following. The pitch angles of the conductors in the conducting layers 3, 6, and 9 and 12 all have a given different value which is selected such that they either increase or decrease in steps from layer to layer between a first value of the radial innermost conducting layer, i.e. conducting layer 3, and a second value of the radial outermost conducting layer, i.e. conducting layer 9. As a result the current will distribute more equally between the individual conducting layers resulting in reduced AC losses compared to the losses in a similar known cable having an equal or approximately equal pitch in all layers.

According to the invention the layer radii and/or the materials of the isolating layers or conductive layers is selected in to fulfil (at least approximately) the following inductance equation:

$$V_i - M_{ij}\frac{dI_i}{dt} + R_iI_i \text{ for } \frac{I_i}{A_i} = \frac{I_j}{A_j} \text{ and } V_i = V_j$$

Where $M_{ij}$ is an inductance matrix, and $V_i$ and $I_i$ are the layer voltage and current, and $A_i$ is the layer cross sectional area. By definition all the $V_i$ are identical (the layers are in parallel). As indicated it is desirable to achieve a cable in which $I_i/A_i$ are also identical. In practice, this is achieved by varying the winding pitches of the conducting layers and/or the layer radii and/or the materials of the isolating layers. Some examples are given below.

It is noted that the high AC loss of the cables having approximately equal pitch in all layers is due to the fact that the current concentrates in the outer layers of the cable. This leads to losses that are virtually identical to the ones found in a solid tube conductor of the dimensions of the cable.

The drawback of cables according to the prior art is the quite large variations of winding pitches which are required to obtain a desired equalization of the current distribution. Cables having these large pitch variations are often technically unrealisable. In addition, strongly varying pitches may not be desirable as they lead to differential thermal contraction of the different layers during cool-down or warm-up of the cable. Further, small variation of the pitches between the layers as well as small pitches are desirable as these result in beneficial mechanical properties of the cable.

According to the invention, the pitch angles of the electrical conductors in the conducting layers are varied in the following way. The value of the pitch angles increases in steps from layer to layer between a first value in the radial innermost conducting layer to a second value in an intermediate conducting layer. The intermediate conducting layer is a conducting layer located between the radial innermost of the conducting layers and the radial outermost of the conducting layers. Furthermore, the value of the pitch angles decreases or remains substantially constant from layer to layer between the second value in the intermediate conducting layer and a third value in the outermost of the conducting layers. The variation in pitch angles are not illustrated in a separate figure, but when referring to FIG. 1, the innermost conducting layer and the outermost conducting layer are denoted 3 and 12, respectively. The intermediate layer may be the conducting layer 6 or the conducting layer 9.

Figure 2:
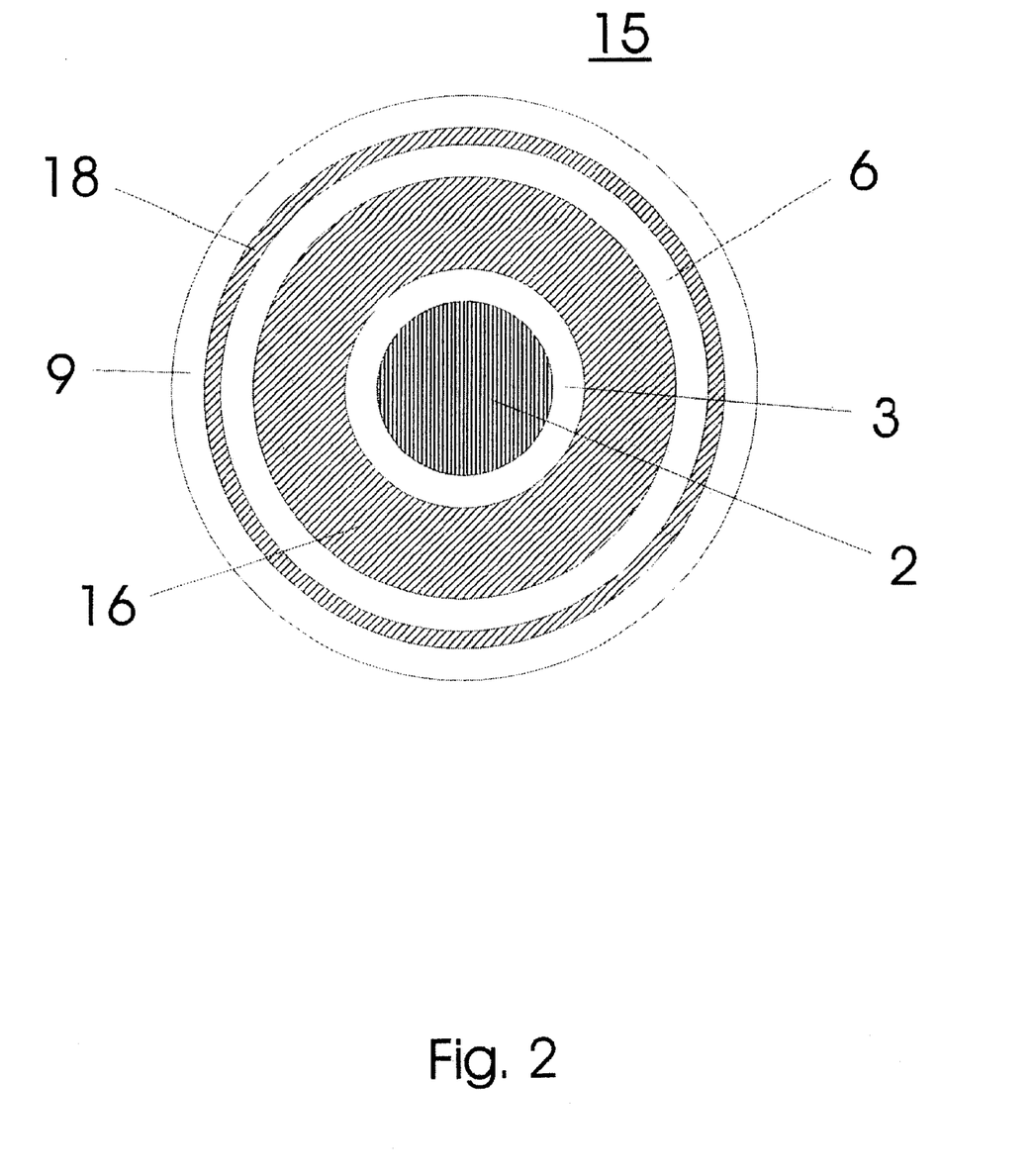
FIG. 2 illustrates a first embodiment of the current carrying part of a cable according to the invention.

FIG. 2 illustrates another embodiment of a cable according to the invention. The figure is a cross section view of a cable 15 having a central former 2 and three conducting layers 3, 6 and 9. The conducting layers are mutually separated by isolating layers 16 and 18 as shown in the figure. For example, the isolating layers include mylar, polyamide, polyester, paper, polyester imprinted paper or semiconductor material, and may also include magnetic material.

In the shown embodiment of a cable according to the invention, the isolating layers 16 and 18 varies in thickness, that is, the thickness of the isolating layers decrease in steps from layer to layer between a first value of the radial innermost isolating layer and a second value of the radial outermost isolating layer. By varying the thickness of the isolating layers of the conductor the inductance between the conducting layers is varied. By performing a suitable selection of the thickness of the individual isolating layers of the cable the current will distribute more equally between the conducting layers resulting in reduced AC losses. Below, examples of cables are given.

An example shows a cable with four non-equidistant layers with almost equal winding pitches. The radius given is the radius on which a superconducting tape of 0.18 mm thickness has to be wound.

|  | Layer | | | |
| --- | --- | --- | --- | --- |
|  | 1 | 2 | 3 | 4 |
| Radius/mm | 18.9 | 18.65 | 18.2 | 17.5 |
| Pitch/mm | 250 | 270 | 290 | 290 |

It is noted that the resulting cable has an almost homogeneous current distribution in the three outermost layers.

It is further noted that the pitches are rather small and almost equal which improves the mechanical (bending) properties of the cable. Differential contraction of different layers is minimised.

A second example shows a cable according to the invention with four non-equidistant layers with almost equal winding pitches. The radius given is the radius on which a superconducting tape of 0.18 mm thickness has to be wound.

|  | Layer | | | | | | | |
| --- | --- | --- | --- | --- | --- | --- | --- | --- |
|  | 1 | 2 | 3 | 4 | 5 | 6 | 7 | 8 |
| Pitch/mm | 205 | 240 | 290 | 350 | 400 | 440 | 480 | 470 |

Mylar type with a thickness of 50 μm is used as layer insulation, and the superconducting tapes are about 0.2 mm thick. It is noted, that here is a specific pattern in the winding pitches—the outer layers have short winding pitches, and the inner layer have longer pitches, becoming constant for layers 7 and 8.

Another example is shown below for a four layer cable with a central body. The central body is made from aluminium, and the layers consist of tightly wound copper tapes with for example Mylar inter-layer insulation of 0.05 mm thickness.

|  | Layer | | | | |
| --- | --- | --- | --- | --- | --- |
|  | 1 | 2 | 3 | 4 | 5 |
| Material | Cu | Cu | Cu | Cu | Al |
| Outer diameter/mm | 51.0 | 43.9 | 36.8 | 29.6 | 21.8 |
| Pitch/mm | 180 | 300 | 700 | 700 | ∞ |

The same kind of trend in the winding pattern is visible as in the superconducting cable—the outer layers have short winding pitches, i.e. large pitch angles, and the inner layers have longer winding pitches, i.e. shorter pitch angles. It is noted that in this cable the layer thickness of the conducting layer decrease from the inside to the outside. Another example of a copper cable is given below. In this case the outer diameter of the cable is 51 mm, and the body diameter is 21.8 mm—just like in the above-mentioned example. The conductor layer thickness is approximately constant. It is noted that the symbol "∞" in the table indicates that the given conducting layer is solid.

|  | Layer | | | | | | | |
| --- | --- | --- | --- | --- | --- | --- | --- | --- |
|  | 1 | 2 | 3 | 4 | 5 | 6 | 7 | 8 |
| Material | Cu | Cu | Cu | Cu | Cu | Cu | Cu | Cu |
| Pitch/mm | 150 | 190 | 250 | 400 | 500 | 600 | 600 | ∞ |

Again, the pattern of the winding pitches follows the same trends as seen before—short pitches on the outside, and long pitches on the inside layers. The values of the pitches have been adjusted to account for the dimensions and the resistive component in the inductance equation, which is again approximately fulfilled.

A further improvement of the mechanical properties (torsional strength) of the cable can be achieved when the conductors of at least one of said conducting layers have reverse winding direction in respect to the conductors of at least one of the neighbouring conducting layers.

As was seen above the variation of thickness of the isolating layers can be combined by a variation of pitch angle of the conducting layers, a well as a variation of the thickness of the conducting layers and/or their material.

It is noted that the conductors may include high-$T_c$ superconducting materials, e.g. Y—Ba—Cu—O or (Bi, Pb)—Sr—Ca—Cu—O. The conductors may also include low-$T_c$ superconducting materials, e.g. Nb-based superconducting materials. Or, the conductors may be conventional conductors. It is further noted that the conductor may be formed as tapes, e.g. multi-filament superconducting tapes.

Figure 3:
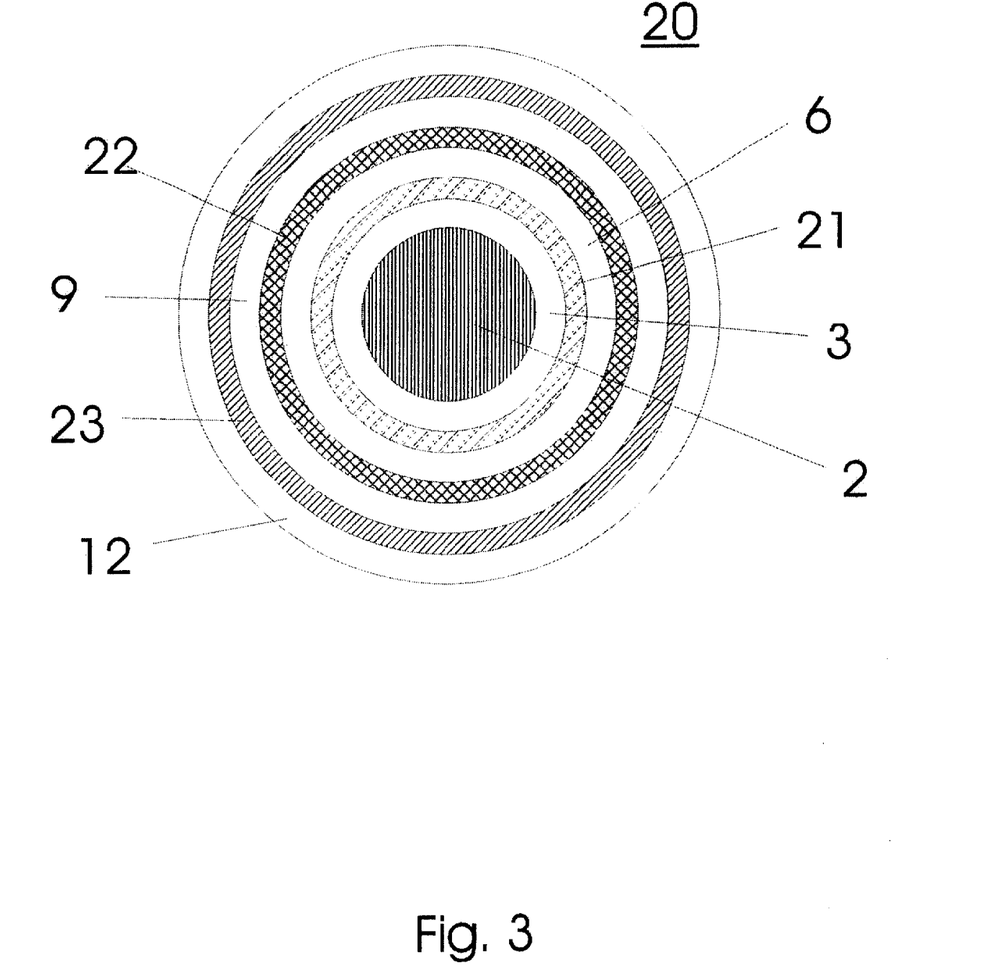
FIG. 3 illustrates a second embodiment of the current carrying part of a cable according to the invention.

FIG. 3 illustrates a further embodiment of a cable according to the invention. The figure shows a cross section view of a cable 20 which include a central former 2 and four conducting layers 3, 6, 9 and 12. The conducting layers are mutually separated by a first isolating layer 21, a second isolating layer 22, and a third isolating layer 23; see FIG. 3.

In the shown embodiment the isolating layers all have the same thickness, but in contrast to the prior art cable shown in FIG. 1, the material of the isolating layers can vary from layer to layer, i.e. the first, second and third isolation layers 21, 22, 24 consist of a first, second and third isolating material, respectively. Magnetic materials may be included in some, but not all layers.

According to the invention the materials of the isolating layers are selected in accordance with their magnetic properties. As mentioned previously, a plurality of effects have influence on the current distribution in the cable, and according to the invention the magnetic properties of the isolating layers have been found to be one of these. The magnetic susceptibility of the isolating layer separating two conducting layers effects the mutual inductance between the conducting layers. The influence of the magnetic) properties of the isolating layers can be explained using a simplified model. In general, the mutual inductance decreases as the magnetically susceptibility increases. Therefore, the current distribution between the conducting layers of a cable can be adjusted by selecting the materials of the isolating layers properly, i.e. an even current distribution and hereby a reduced AC loss can be obtained. In one embodiment, the magnetic susceptibility of the isolating layers vary in steps from layer to layer, e.g. from a first value of the innermost isolating layer to a second value—higher than the first value—of the outermost isolating layer.

Figure 4:
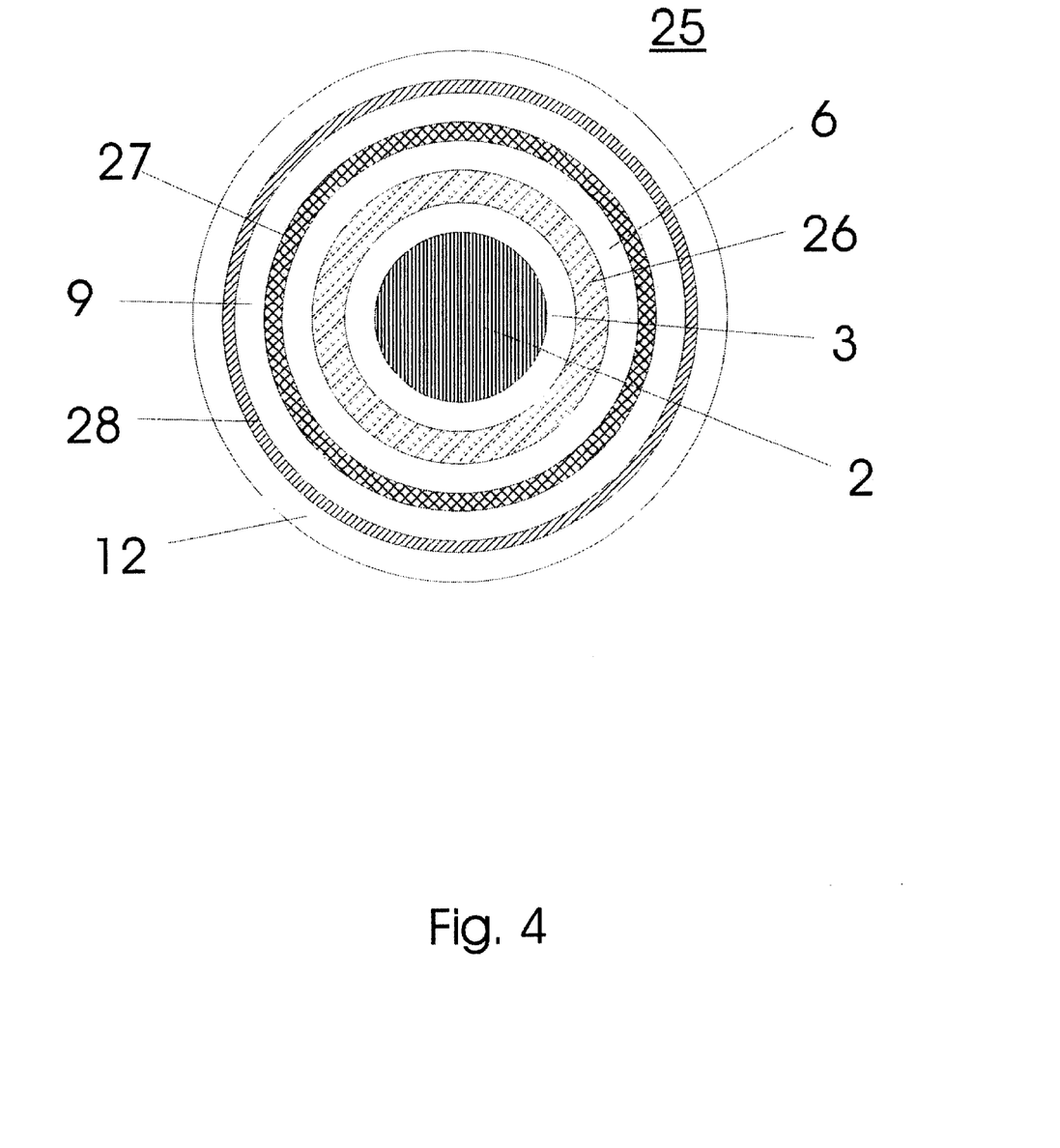
FIG. 4 illustrates a third embodiment of the current carrying part of a cable according to the invention.

FIG. 4 illustrates a further embodiment of a cable according to the invention. The figure shows a cross section view of a cable 25 which include a central former 2 and four conducting layers 3, 6, 9 and 12. The conducting layers are mutually separated by a first, second and third isolating layer 26, 27 and 28; see FIG. 4.

In this embodiment both the thickness of the isolating layers and the material of the isolating layers varies from layer to layer. As can be seen from the figure, the thickness of the isolating layers 26, 27 and 28 decrease in steps from layer to layer between a first value of the radial innermost isolating layer 26 and a second value of the radial outermost isolating layer 28. As mentioned, the material of the isolating layers can also vary from layer to layer, and may include magnetic materials.

It should be noted that the central former of a cable according to the invention can be formed of any isolating material, conventional conducting material, or superconducting material depending on the intended use of the cable. The described principle of a cable having varying thickness of the individual isolating layers can also be used on cables without a central former.

Further, it should be noted that a cable according to the invention can include an arbitrary number of conducting layers. Likewise, the thickness of the isolating and conducting layers and the pitches can be varied arbitrarily.

In another embodiment of the invention one or more of the isolating layers consists of a number of layers. Hereby, such isolating layers—which may be called multi-layered isolating layers—can be composed of different materials giving the isolating layer desired mechanical and/or electrical characteristics.

It is further noted, that the desired reduction of the AC losses can be reached as a combination of the effect obtained by the variation of the thickness of the isolating layers and/or the isolating material. In addition, pitches of the conducting layers may also be varied.

Although preferred embodiments of the present invention have been described and shown, the invention is not restricted to those. It may also be embodied in other ways within the subject-matter defined in the following claims. For example, the same principle can be used in multi-core cables, i.e. a cable of the described type can be a single core of a multi-core cable having one or more of similar cores and/or one or more of state of the art cable cores. A cable core may also include a number of sub-cores which may or may not have the structure of a core according to the invention. As another example, the cable can include one or more non-concentric conducting and/or isolating layers. Further, one or more of the conducting and/or isolating layers can be formed to have an arbitrary shape, e.g. oval or approximately oval, elliptical or approximately elliptical.

What is claimed is:

1. A cable with at least one cable core having three or more conducting layers which are mutually separated by isolating layers, where said conducting layers include electrical conductors which are arranged helically with predetermined pitch lengths characterized in that said predetermined pitch lengths increase in steps from layer to layer from a radial outermost conducting layer to an intermediate conducting layer located between a radial innermost conducting layer and the radial outermost conducting layer so that corresponding pitch angles decrease in steps and said predetermined pitch lengths remain substantially constant or decrease in steps from layer to layer from said intermediate conducting layer to the radial innermost conducting layer so that corresponding pitch angles remain substantially constant or increase in steps.

2. A cable according to claim 1, characterized in that a least one of said isolating layers has a thickness different from a thickness of at least one other of the isolating layers.

3. A cable according to claim 1, characterized in that at least one of said conducting layers has a thickness different from a thickness of at least one other of the conducting layers.

4. A cable according to claim 1, characterized in that at least one of said isolating layers is thicker than a radial outermore one of the isolating layers.

5. A cable according to claim 1, characterized in that at least one of said conducting layers is thicker than a radial outermore one of the conducting layers.

6. A cable according to claim 1, characterized in that thicknesses of said isolating layers decrease in steps from layer to layer between a first value of a radial innermost one of the isolating layers and a second value of a radial outermost one of the isolating layers.

7. A cable according to claim 1, characterized in that thicknesses of said conducting layers decrease in steps from layer to layer between a first value of the radial innermost conducting layer and a second value of the radial outermost conducting layer.

8. A cable according to claim 1, characterized in that at least one of said isolating layers includes material which is different from material of at least one other of the isolating layers.

9. A cable according to claim 8, characterized in that the magnetic susceptibility of the isolating layers varies from layer to layer.

10. A cable according to claim 1, characterized in that at least one of said conducting layers includes material which is different from material of at least one other of the conducting layers.

11. A cable according to claim 10, characterized in that the resistivity of the conducting layer material increases in steps from layer to layer from a first value of the radial innermost conducting layer to a second value of the radial outermost conducting layer.

12. A cable according to claim 1, characterized in that said conductors includes super-conducting material.

13. A cable according to claim 12, characterized in that said super-conducting material is high-$T_c$ super-conducting material.

14. Use of cable according to claim 1 as an AC power cable, an overhead line, or a drive cable for an electrically driving vehicle.

15. A method of constructing a cable with at least one cable core having three or more conducting layers which are mutually separated by isolating layers, where said conducting layers include electrical conductors which are arranged helically with predetermined pitch lengths, characterized in that said predetermined pitch lengths are selected to increase in steps from layer to layer from a radial outermost conducting layer to an intermediate conducting layer located between a radial innermost conducting layer and a the radial outermost conducting layer so that corresponding pitch angles decrease in steps, and said predetermined pitch lengths are selected to remain substantially constant or decrease in steps from layer to layer from said intermediate conducting layer to said radial innermost conducting layer so that corresponding pitch angles remain substantially constant or increase in steps.

16. A method according to claim 15, characterized in that the thickness of at least one of said isolating layers is selected to be different from the thickness of at least one of the other isolating layers.

17. A method according to claim 15, characterized in that a thickness of at least one of said conducting layers is selected to be different from a thickness of at least one other of the conducting layers.

18. A method according to claim 15, characterized in that a material of at least one of said isolating layers is selected to be different from a material of at least one other of the isolating layers.

19. A method according to claim 15, characterized in that a material of at least one of said conducting layers is selected to be different from a material of at least one other of the conducting layers.

* * * * *